(12) United States Patent
Rescorla et al.

(10) Patent No.: US 7,305,450 B2
(45) Date of Patent: Dec. 4, 2007

(54) METHOD AND APPARATUS FOR CLUSTERED SSL ACCELERATOR

(75) Inventors: Eric Rescorla, Palo Alto, CA (US); Adam Cain, Madison, WI (US); Brian Korver, San Francisco, CA (US); Tom Kroeger, Santa Cruz, CA (US); David Kashtan, La Selva Beach, CA (US); Craig Watkins, State College, PA (US)

(73) Assignee: Nokia Corporation, Espoo (FI)

( * ) Notice: Subject to any disclaimer, the term of this patent is extended or adjusted under 35 U.S.C. 154(b) by 711 days.

(21) Appl. No.: 10/091,479

(22) Filed: Mar. 7, 2002

(65) Prior Publication Data

US 2002/0161834 A1  Oct. 31, 2002

Related U.S. Application Data

(60) Provisional application No. 60/279,441, filed on Mar. 29, 2001.

(51) Int. Cl.
*G06F 15/16* (2006.01)
(52) U.S. Cl. .............. 709/208; 709/203; 709/227; 709/228; 709/234; 709/235; 709/242
(58) Field of Classification Search ......... 709/228, 709/234, 242, 209, 227, 235, 208, 203; 713/151
See application file for complete search history.

(56) References Cited

U.S. PATENT DOCUMENTS 6,006,259 A    12/1999   Adelman et al.
6,078,957 A     6/2000   Adelman et al.
6,094,485 A     7/2000   Weinstein et al.
6,148,410 A    11/2000   Baskey et al.
6,212,280 B1 *  4/2001   Howard et al. ............. 380/279
6,253,334 B1 *  6/2001   Amdahl et al. ................ 714/4
6,367,009 B1 *  4/2002   Davis et al. ................. 713/166
6,424,992 B2 *  7/2002   Devarakonda et al. ...... 709/203
6,449,641 B1 *  9/2002   Moiin et al. ................. 709/220
6,490,624 B1 * 12/2002   Sampson et al. ........... 709/227
6,553,442 B1 *  4/2003   Arimilli et al. ............. 710/110
6,643,701 B1 * 11/2003   Aziz et al. .................. 709/227
6,691,165 B1 *  2/2004   Bruck et al. ................ 709/227

(Continued)

OTHER PUBLICATIONS

Postel, J., "Transmission Control Protocol", RFC 793 (Sep. 1991), http://www.ietf.org/rfc0793.txt, pp. 1-88.

(Continued)

*Primary Examiner*—Michael Y. Won
(74) *Attorney, Agent, or Firm*—Banner & Witcoff Ltd (57) ABSTRACT

Method and apparatus for clustered Secure Sockets Layer (SSL) acceleration where two or more SSL relays are connected in a cluster. Information is transferred between a first node (typically, the client) and one of the SSL relays where the transferred information is related to communication between the first node and a second node (typically, the server). The state information of an SSL connection between the first node and the one SSL relay is clustered. The clustering includes sharing the state information between the one SSL relay and each of the one or more SSL relays. Any of the SSL relays can take over all connections of another of the clustered SSL relays therefore, providing no interruption in the communication should any of the SSL relays fail.

36 Claims, 8 Drawing Sheets

U.S. PATENT DOCUMENTS

| | | | |
|---|---|---|---|
| 6,691,244 B1 * | 2/2004 | Kampe et al. | 714/4 |
| 6,874,089 B2 * | 3/2005 | Dick et al. | 726/14 |
| 6,877,107 B2 * | 4/2005 | Giotta et al. | 714/4 |
| 6,959,281 B1 * | 10/2005 | Freeling et al. | 705/10 |
| 7,000,021 B1 * | 2/2006 | Radhakrishnan et al. | 709/230 |
| 7,062,570 B2 * | 6/2006 | Hong et al. | 709/238 |
| 7,076,555 B1 * | 7/2006 | Orman et al. | 709/227 |
| 7,155,515 B1 * | 12/2006 | Brown et al. | 709/226 |
| 2003/0037234 A1 * | 2/2003 | Fu et al. | 713/158 |
| 2005/0086197 A1 * | 4/2005 | Boubez et al. | 707/1 |

OTHER PUBLICATIONS

Hickman, K., "the SSL Protocol", (Feb. 1995), http://home.netscope.com/eng/ssl3/draft302.txt, pp. 1-62.

Dierks, T., and Allen, C., "The TLS Protocol Version 1.0", RFC 2246 (Jan. 1999), http://www.ietf.org/rfc2246.txt, pp. 1-75.

* cited by examiner

METHOD AND APPARATUS FOR CLUSTERED SSL ACCELERATOR

This application claims the benefit of U.S. Provisional Patent Application No. 60/279,441, filed Mar. 29, 2001, the contents of which is incorporated by reference herein in its entirety.

BACKGROUND

1. Field of the Invention

This invention relates to Secure Socket Layer (SSL) information transfers, and more specifically to clustered SSL accelerators for information transfers.

2. Background Information

Secure Sockets Layer (SSL) and its successor Transport Layer Security (TLS) are the dominant approaches to web security. Both protocols provide a secure channel over which ordinary web traffic (Hyper Text Transfer Protocol (HTTP)) can be transmitted. HTTP over SSL (HTTPS) is widely used to protect confidential information in transit between a client and server.

However, SSL is dramatically more CPU intensive than ordinary TCP communication and the addition of SSL to unsecure web servers can create unacceptable performance consequences on the web server. The dominant performance cost is for the public key encryption algorithm (e.g., RSA) operation in the SSL handshake. One common approach to reducing this cost is to offload the RSA operations into a cryptographic co-processor that is installed on the server machine.

The co-processor approach has a number of disadvantages: (1) the server software must be co-processor aware; (2) the case must be open to insert the co-processor; and (3) it can be difficult to match the co-processor to the CPU such that neither is idle much of the time. Scaling problems may also arise because the speed at which the co-processor can handle the traffic may not match the speed at which the host CPU can handle it.

One response to the failing of the co-processor approach has been to create standalone cryptographic accelerators. These accelerators are network devices that reside between the client and server. They accept HTTPS connections from a client, decrypt them, and make HTTP connections to the web server. Examples of such devices include iPIVOT/Intel's Netstructure accelerators, F5's BigIP accelerator, and Andes Network's Nonstop SSL products. One key advantage of standalone accelerators is that scaling is relatively simple, i.e., more than one box can be purchased allowing the traffic to be load balanced across the accelerators.

In conventional configurations, having multiple standalone accelerators may provide improved performance since if a given accelerator fails, other accelerators may be available to handle the load. However, these configurations only offer high availability in a bulk sense. All SSL connections terminated on a failing box are simply lost. A customer perceives this as an input/output (I/O) error of some kind. Although the remaining boxes are still available to handle future connections and the accelerators as a group remain available, there is no high availability at the connection level.

SUMMARY

The present invention is related to a method for clustered Secure Sockets Layer (SSL) acceleration that includes: connecting at least two SSL relays in a cluster; transferring information between a first node, (e.g., a client), and one of the at least two SSL relays, the transferred information related to communication between the client node and a second node, (e.g., a server), and clustering (sharing among all nodes of the cluster) the state information of an SSL connection between the client and the one of the at least two SSL relays as well as the state information of a connection between the server and the one of the at least two SSL relays. Any of the at least two SSL relays can take over all connections of another of the at least two SSL relays, therefore, providing no interruption in the communication should any of the at least two SSL relays fail.

The present invention is also directed to a system for clustered Secure Sockets Layer (SSL) acceleration that includes a first node (e.g., client), at least two SSL relays connected in a cluster where the cluster is operatively connected to the client node, and a second node (e.g., server) operatively connected to the at least two clustered SSL relays. One of the at least two clustered SSL relays transfers information between the client and the server nodes. The state information of an SSL connection between the client and the one at least two SSL relays is shared across each at least two SSL relays. Any of the at least two SSL relays are capable of taking over all connections of another of the at least two SSL relays therefore providing no interruption in the transfer of information should any of the at least two SSL relays fail.

The present invention is further directed to an apparatus comprising a storage medium containing instructions stored therein. The instructions when executed cause a computing device to perform: connecting the computing device with at least one other computing device in a cluster; transferring information between a first node (e.g., client) and the computing device, where the transferred information is related to communication between the client and a second node (e.g., server); and clustering the state information of the connections between the computing device and the client and server nodes. Any of the computing devices can take over all connections of another computing device, therefore, providing no interruption in the communication with the client and server nodes should any of the computing devices fail.

The present invention is still further directed to an SSL relay. The SSL relay may be connected in a cluster of SSL relays. The SSL relay includes: a first interface for transferring information between a first node (e.g., client) and the SSL relay; a second interface for transferring information between a second node (e.g., server) and the SSL relay; a third interface for transferring information between SSL relays in the cluster; and a storage device. The state information of an SSL connection between the client and the SSL relay is shared across each SSL relay in the cluster. Any of the SSL relays in the cluster are capable of taking over all connections of another SSL relay in the cluster therefore providing no interruption in the transfer of information should any of the SSL relays in the cluster fail.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention relates to method and apparatus for clustered SSL accelerators that provide high availability for individual connections by sharing the state of each SSL connection across the entire cluster. If any node in the cluster fails, the rest of the nodes are able to take over all connections terminating on that node with no interruption in service.

Figure 1:
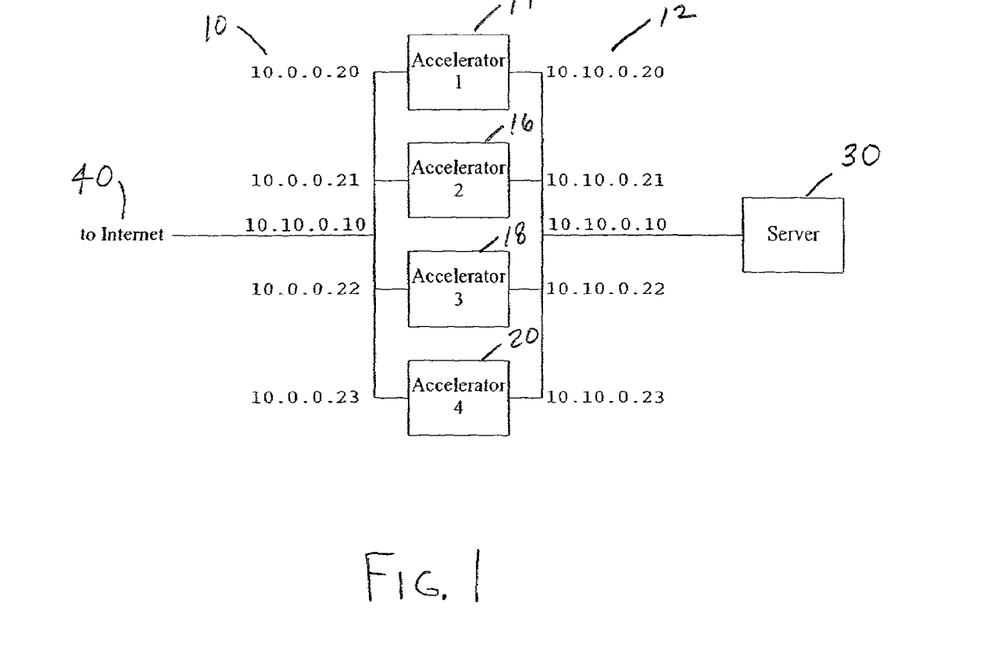
FIG. 1 is a block diagram of a typical cluster topology according to an example embodiment of the present invention.

FIG. 1 shows a block diagram of a typical cluster topology according to an example embodiment of the present invention. The cluster is an appropriately configured set of machines or computing devices on the same network. These machines 14, 16, 18, 20 may be SSL relays. The cluster of machines may reside between a server 30 and an interface to the Internet 40. This interface may be used to connect the cluster one or more network nodes such as client machines (not shown). All machines have external interfaces on one wire and their internal interfaces on another wire. Each machine may have a pair of IP addresses 10, 12, one internal and one external. Communication between cluster members may take place via a User Datagram Protocol (UDP) packet. These packets may be unicast, multicast, or broadcast, depending on the situation. Intracluster communication may be protected via a Medium Access Control (MAC) and optional encryption. For added security, state updates may be performed only on the internal interface.

The entire cluster behaves as if it were a single piece of hardware. However, each cluster member listens on the cluster IP address, therefore, seeing every packet addressed to the cluster. A cluster member may be maintaining one of two types of state information, a working resources state or a mirror state. If a member is handling a given TCP connection, the member may have various working resources allocated to it, e.g., sockets, memory buffers, etc. However, since any other member must be prepared to take over for that member at any given time, the other members must possess a mirrored state. A mirrored state is a passive state sufficient to recreate the working resources in order to handle the workload. Only the minimal amount of state to allow other members to reproduce the original state upon failover may be sent to each member. Further, each individual member may not need to be configured with all state information. Once a member is configured as part of the cluster, state information and other configuration information may be propagated automatically.

Therefore, according to the present invention, clustered machines may automatically propagate a connection state from the machine handling the connection to the rest of the machines in the cluster. If a member is handling traffic for a given connection, when the member fails, that IP packet may be dropped. However, when the packet is retransmitted, the member that is now handling the connection (i.e., new member) automatically processes it correctly. There may be some delay while waiting for the retransmission. This delay is all that may be seen by a client and server.

When a packet arrives destined for the cluster, the Internet Protocol (IP) stack on each cluster member automatically computes a hash function on the source address, source port, destination address, and destination port four-tuple. The function maps each packet into one of a small number of "buckets". If the resulting bucket is assigned to a particular member, then that member handles the packet. Otherwise, that member discards the packet. Note that since only the address pair is used to compute the bucket, all packets corresponding to a given TCP connection fall into the same bucket. One member of the cluster, a cluster master, may be responsible for assigning each bucket to some cluster member. Each member in a cluster may send out a stream of cluster "keepalives" on both interfaces. If a sufficiently long time passes between keepalives (typically 250-500 ms) then the master declares the member dead and proceeds to reassign that member's workload to other cluster members.

The simpler case of clustering TCP will be illustrated to help understand the clustering of SSL that will be discussed later. A simple TCP relay will be illustrated that behaves the same way as the SSL relay but without the decryption function, thereby allowing illustration of a number of the important features of a clustered SSL relay while allowing us to ignore the additional complications introduced by SSL.

Most TCP stacks select port numbers for active opens using a counter. However, this may cause the relay-server connection to fall into a different bucket from the client-relay connection. Therefore, according to the present invention, the port number is carefully chosen so that the two connections fall into the same bucket. For illustration, assume that our relay accepts connections on port 443 and connects to the server on port 80. These are the same ports that would likely be used in an SSL relay.

Figure 2:
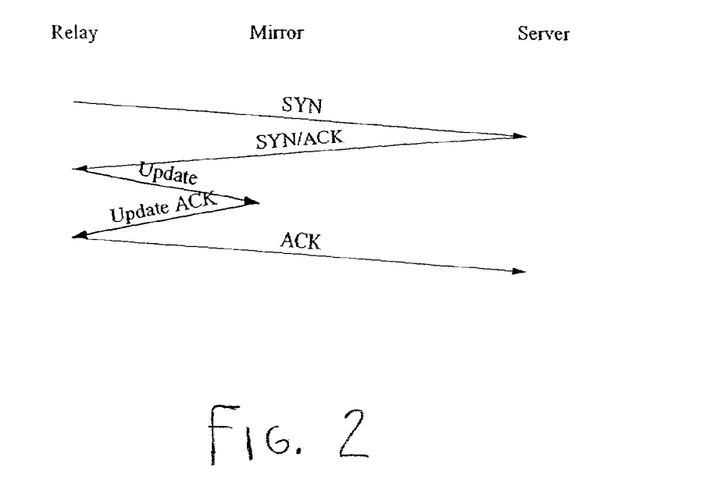
FIG. 2 is a diagram of a clustered TCP connection according to an example embodiment of the present invention.

FIG. 2 shows a diagram of a clustered TCP connection according to an example embodiment of the present invention. A client (not shown) has a connection with a relay in the cluster. The mirror is relay also a member of the cluster. Once the connection from the client has been accepted, the relay connects to the server. During this connection transfer, there are two locations where crashes may occur. First, a crash may occur before the cluster update is received. Secondly a crash may occur after the cluster update has been received. In the case where a cluster update has been transmitted but not received, this is the same as where the cluster update hasn't been transmitted.

In the case where the crash occurs before the update is received, when the mirror comes online it may have no knowledge of the socket. If it tries to initiate a new connection with the server, the server may respond with a RST because the initial sequence number (ISN) will be different. This can be overcome if the mirror uses the same ISN as the relay, i.e., the same ISN as the client used. Thus, when the first packet of data from the client arrives, the accept cycle will start over again cleanly. The ISN can be derived from the sequence number of the first packet from the client.

If the crash occurs after the update is received, then the mirror may come online with the appropriate mirrored state. It may resurrect the sockets connected to the client and the server. When the server retransmits its SYN/ACK, the relay transmits the ACK immediately. Since the state update has already occurred, there is no need to do it again before transmitting it to the client.

The contents of a state update may be simply a version of the TCP protocol control block. The state is extracted from a socket and then a new socket is created with a given state. A state update may consist of portable versions of the connection to the client and the connection to the server.

The state of the client's socket is the state after receipt of the clients ACK. Regarding the server socket state, the server socket state may clustered as it would be after having ACKed the server's SYN/ACK. Thus, if the socket has to be reinstantiated on a mirror, it may automatically have the new ACK state. Therefore, generally a state is clustered before network traffic is sent. This ensures that the mirror enters the new state before the network peer knows about it.

The TCP state elements that may require management are the sequence numbers. For each connection the sequence number that has been acknowledged (ACKed) and the next sequence number to transmit (snd_nxt) are known. Since data buffers are generally not clustered, it may be required that the next sequence number to receive (rcv_nxt) be equal to the ACK pointer, and that snd_nxt not be incremented until data is acknowledged by the peer. Thus, a given update may be specified by the four-tuple (client_rcv_nxt, client_snd_nxt, server_rcv_nxt, server_snd_nxt). Withholding the ACK until the cluster update has been received may require modification to the TCP stack. Further, the ACK pointer may need to be separated from the rcv_nxt value. A new element (rcv_appack) is added in the TCP. This value may be controlled by an application programming interface (API) call. In order to avoid potential problems by this modification, ACKs may need to be suppressed until the application allows them.

Further, a RST that may be generated after receipt of an ACK or an unknown connection may need to be suppressed for a short period of time after a failover. In the case where an ACK is received in advance of the snd_nxt value on the restored mirror, rights may need to be discarded until snd_nxt equals the new ACK value.

Figure 3:
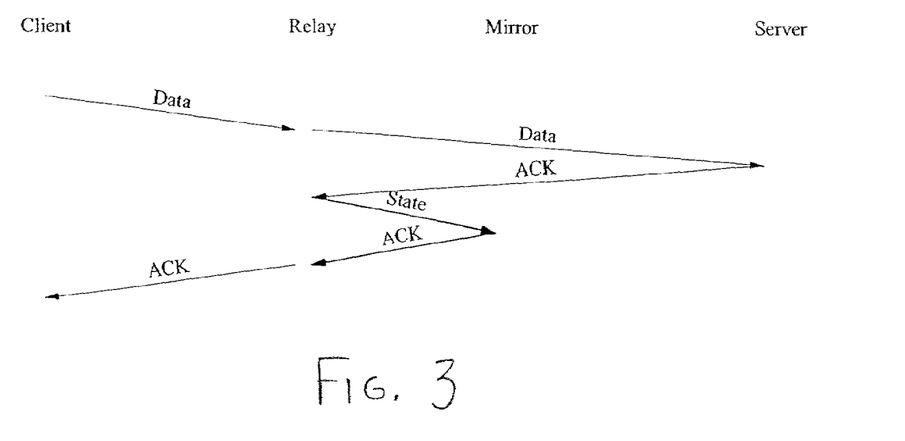
FIG. 3 is a diagram of a clustered client to server write according to an example embodiment of the present invention.

FIG. 3 shows a diagram of a clustered client to server write according to an example embodiment of the present invention. Once connections have been established and clustered, data can be transferred. The data communication may be clustered after the server ACKs the data. Once the update has been ACKed the relay sends the ACK to the client. An API call provides the ability to determine when data has been ACKed by the peer. If the relay crashes right after receiving the client write, the client may retransmit the data. When the client retransmits the data, the mirror handles it as if it were being sent for the first time. If the relay fails after transmitting the data to the server, the client retransmits and the mirror writes the data to the server. To the server, this merely looks like a retransmit that might happen under normal circumstances if the server's ACK were lost. This scenario also applies in the case where the relay fails after receiving the server's ACK.

If the relay fails after clustering the state, the simplest possibility is that the client retransmits the data. However, this time the mirror's TCP state may already have its ACK pointer at S+d (where S is the state at the beginning of the transaction, and d is the size of the data in bytes) and, therefore, drops the data and sends an immediate ACK for S+d bytes. This may force waiting for the 500 ms TCP retransmit timer. It is more efficient for the mirror to send a single ACK when it comes online (to reduce latency).

Therefore, according to the present invention, for reducing cluster update size the client buffers the data by withholding the ACK until the data has been acknowledged by the server. Failovers, therefore, result in TCP retransmits. Device failures then appear like intermittent network lossage of the kind that TCP is already designed to handle. Moreover, to avoid possible problems, the SSL relay uses absolute (rather than relative) TCP sequence numbers and the value of each sequence number is maintained as it was last clustered.

Figure 4:
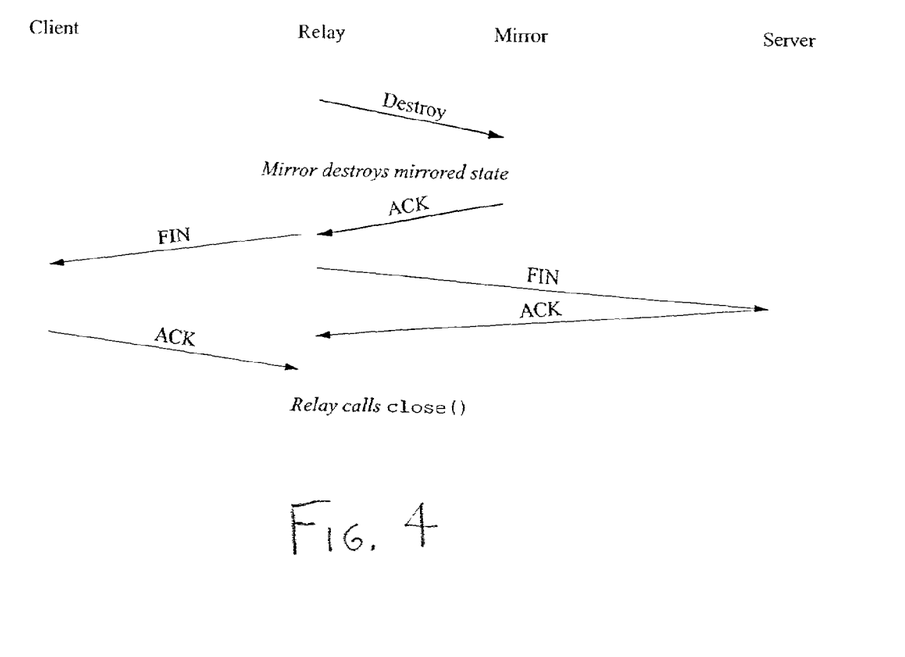
FIG. 4 is a diagram of a clustered TCP close according to an example embodiment of the present invention.

FIG. 4 shows a clustered TCP close according to an example embodiment of the present invention. The relay sends an update indicating that it is about to close. Once that update has been ACKed the relay calls "shutdown( )" on both sockets. Once the FINs ("Finished" messages) have been ACKed the relay calls "close( )". To avoid possible problems (e.g., the relay handling the connection leaves the cluster before the peer's FIN is received), TCP keepalives with a timer of one minute may be turned on before calling close( ). When the keepalive timer fires and no response is received, the socket may automatically be discarded.

Clustering secure sockets layer (SSL) encompasses roughly the same set of tasks as clustering TCP. However, SSL is unique in that: (1) an SSL handshake that involves interaction with the client needs to be clustered; (2) SSL data is structured in a record format whereas the data pushed over SSL is essentially freeform; (3) cryptographic keying material both on a global and a per connection basis need to be clustered; (4) the SSL session cache must be shared across the entire cluster; and (5) SSL has its own closure sequence on top of TCP.

Figure 5:
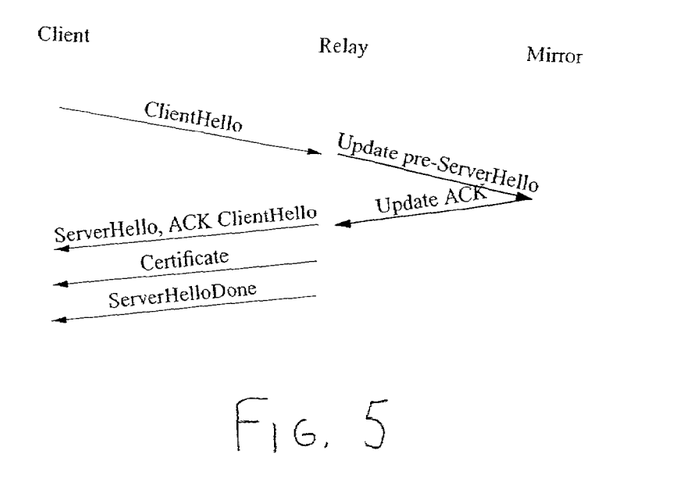
FIG. 5 is a diagram of a clustered SSL ClientHello according to an example embodiment of the present invention.

FIG. 5 shows a diagram of a clustered SSL ClientHello according to an example embodiment of the present invention. The client sends a ClientHello to the relay. The relay then transmits an Update pre-ServerHello to the mirror that returns with an Update ACK to the relay. The relay then sends the ServerHello, ACK, ClientHello, Certificate, and ServerHelloDone to the client.

A "pre-ServerHello" state may contain client and server random values and the chosen cipher suite. Further, every handshake update may contain the new TCP state, the current value of the SSL handshake hashes, and/or the handshake to enter upon failover-in this case writing the ServerHello. If a failover occurs when the mirror is in this state, the mirror generates a new ServerHello using the clustered random value and containing an ACK of the ClientHello. The state may be clustered before generation of the messages. This reduces the latency inherent in these operations. However, the messages are not actually transmitted until the Update is ACKed. The messages may be queued and the queued emptied upon receipt of the ACK.

Figure 6:
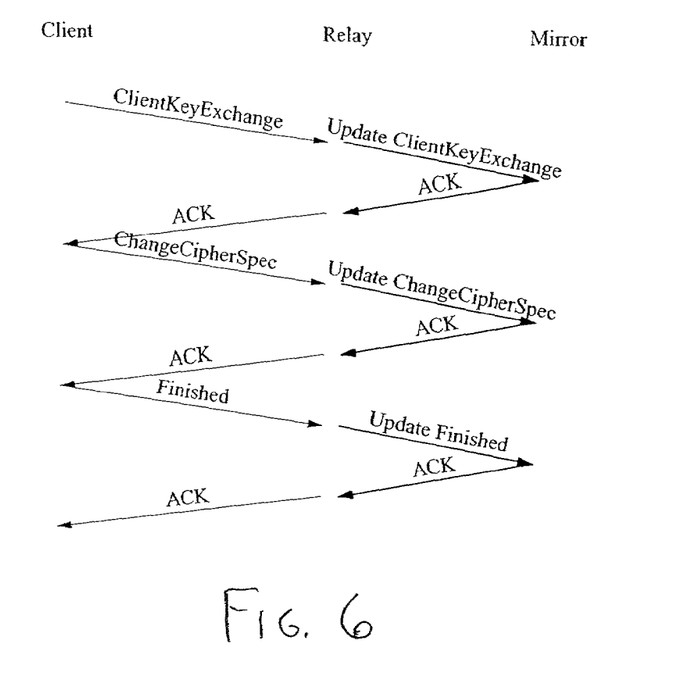
FIG. 6 is a diagram of a clustered SSL ClientKeyExchange according to an example embodiment of the present invention.

FIG. 6 shows a diagram of a clustered SSL ClientKeyExchange according to an example embodiment of the present invention. Once a client receives the ServerHelloDone, the client sends the ClientKeyExchange followed by the ChangeCipherSpec, and Finished. Each of these are in turn received by the relay and sent to the mirror whereby the mirror responds with a ACK to the relay that subsequently transfers an ACK to the client. The first update shown in FIG. 6 contains the encrypted PreMaster secret. Latency may be reduced by decryption of the PreMaster secret and the cluster update in parallel. The second update contains the master secret and the pending cipher states in both directions. Finally, the third update may contain the new read cipher state after having read the Finished message.

It is possible that a client may send all three update messages at the same time. In this case, the process may be optimized by the relay detecting this and issuing one cluster update to the mirror instead of three.

Figure 7:
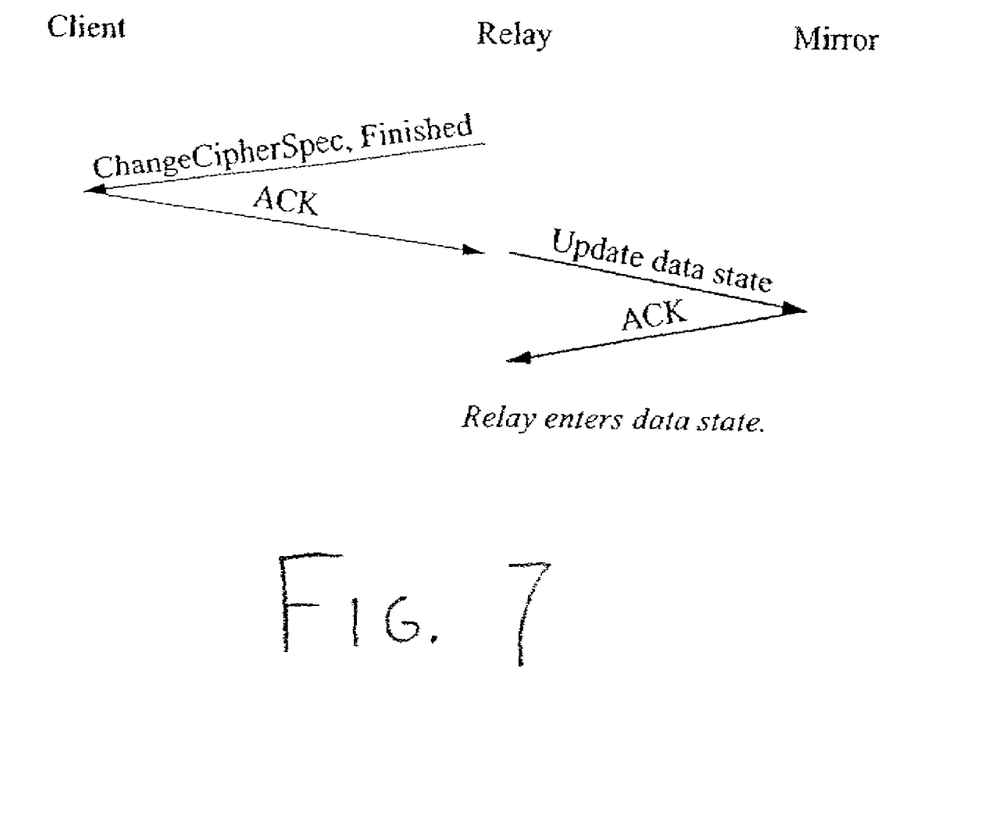
FIG. 7 is a diagram of a clustered SSL Finished according to an example embodiment of the present invention.
Figure 8:
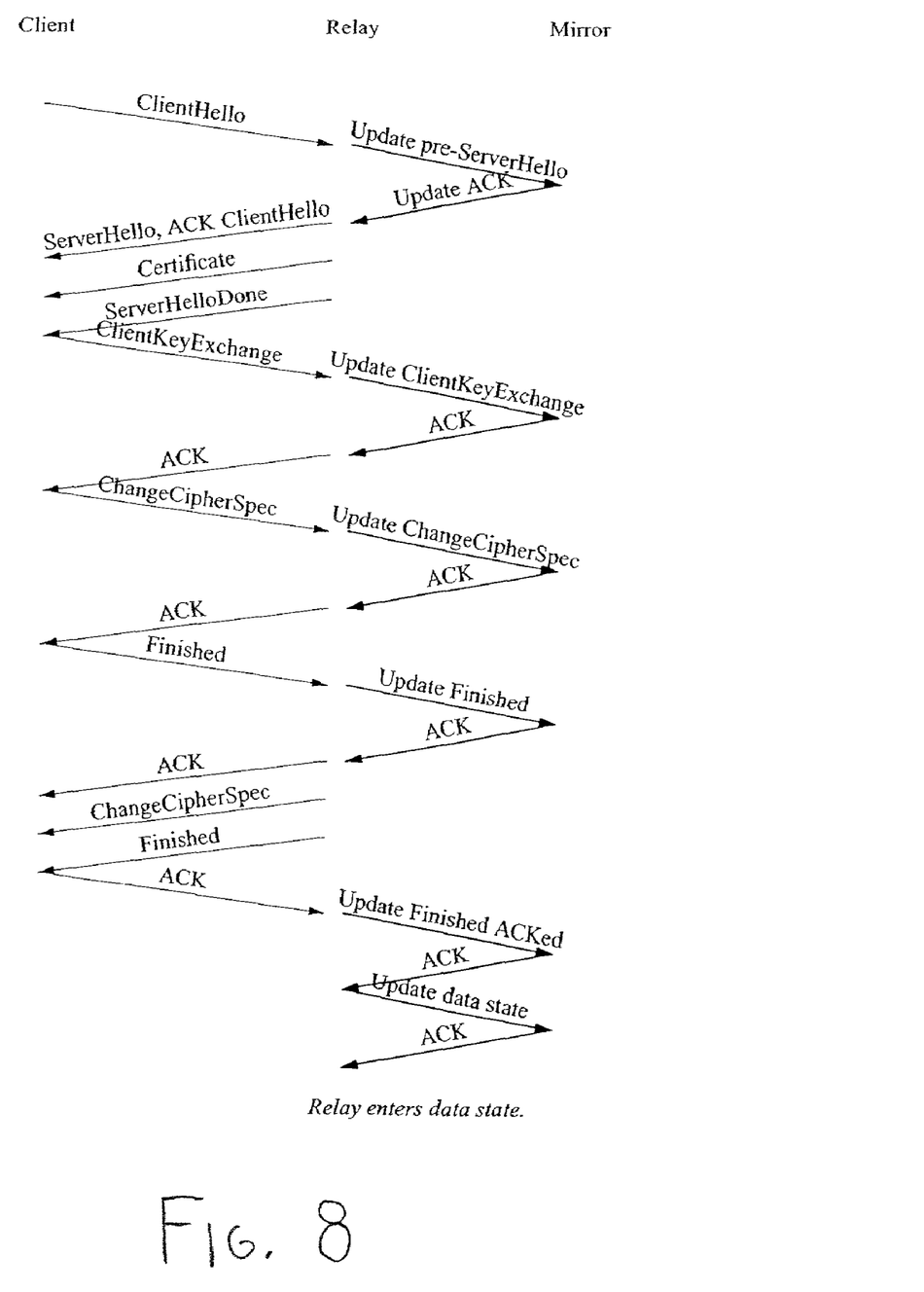
FIG. 8 is a diagram of clustered ClientHello to Finished according to an example embodiment of the present invention.

FIG. 7 shows a diagram of a clustered SSL Finished according to an example embodiment of the present invention. The relay sends its own ChangeCipherSpec and Finished messages to the client. When the Finished message is ACKed, the handshake is over and the relay clusters the entry into the data state. This message may also contain the new write cipher state after having written the Finished. Once that update is ACKed the relay may then enter the data state. FIG. 8 shows a diagram of clustered ClientHello to Finished according to an example embodiment of the present invention.

Figure 9:
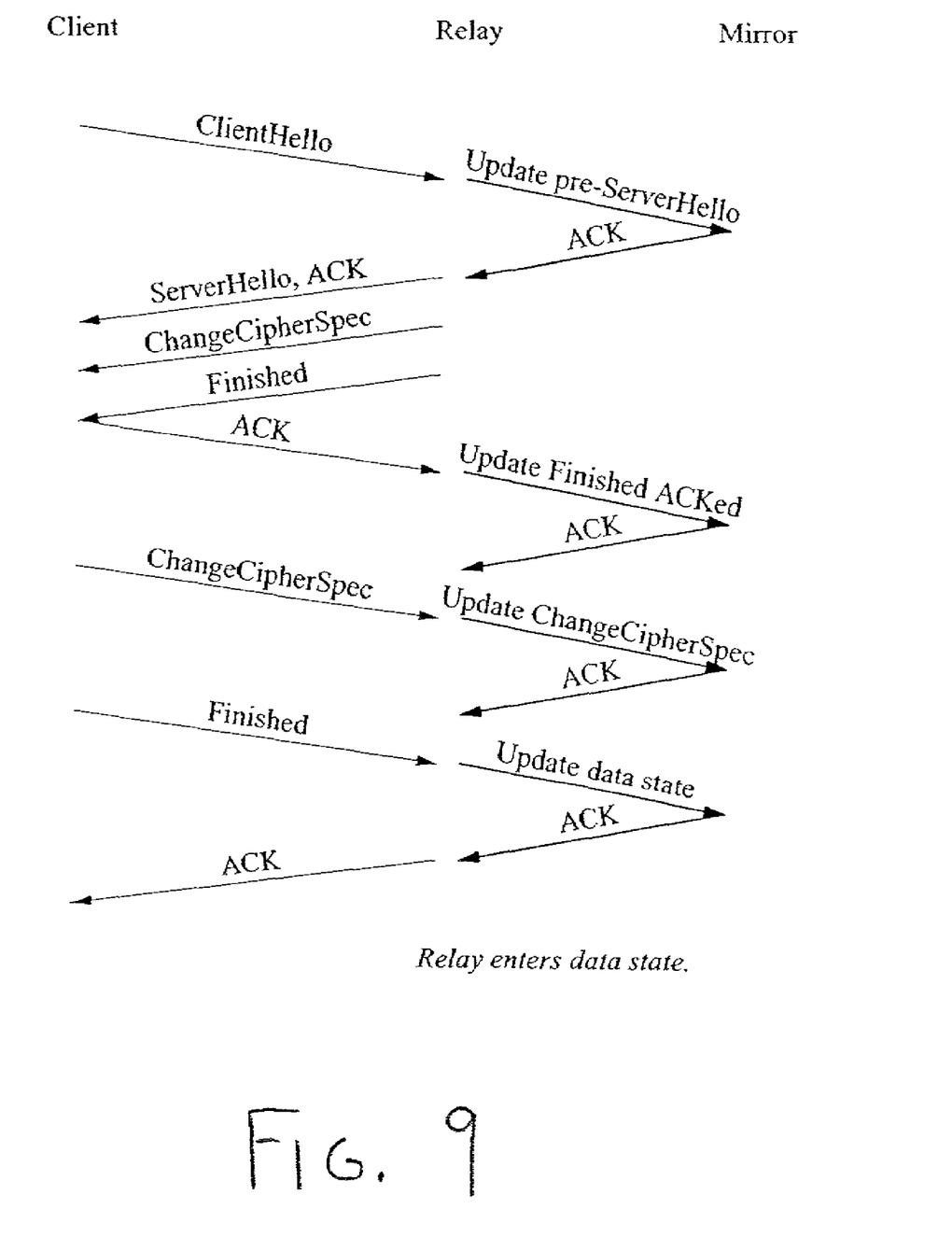
FIG. 9 is a diagram of clustering a SSL resumed handshake according to an example embodiment of the present invention.

FIG. 9 shows a diagram of clustering a SSL resumed handshake according to an example embodiment of the present invention. SSL includes a session resumption feature that allows the client and server to skip the RSA key exchange step. In a clustered system, there is no guarantee that the same relay will handle the client when it reconnects again, therefore, the session cache may be clustered. Sessions are stored in a hash table. When a mirror receives the cluster update indicating the end of the handshake, it inserts the session information into the local session cache. When a client request resumption, the relay just consults its own hash table. Clustering the session resumption handshake follows essentially the same pattern as the ordinary handshake except that the steps for clustering the transmission and receipt of Finished are switched. The last two cluster updates in FIG. 9 may be collapsed into one.

Figure 10:
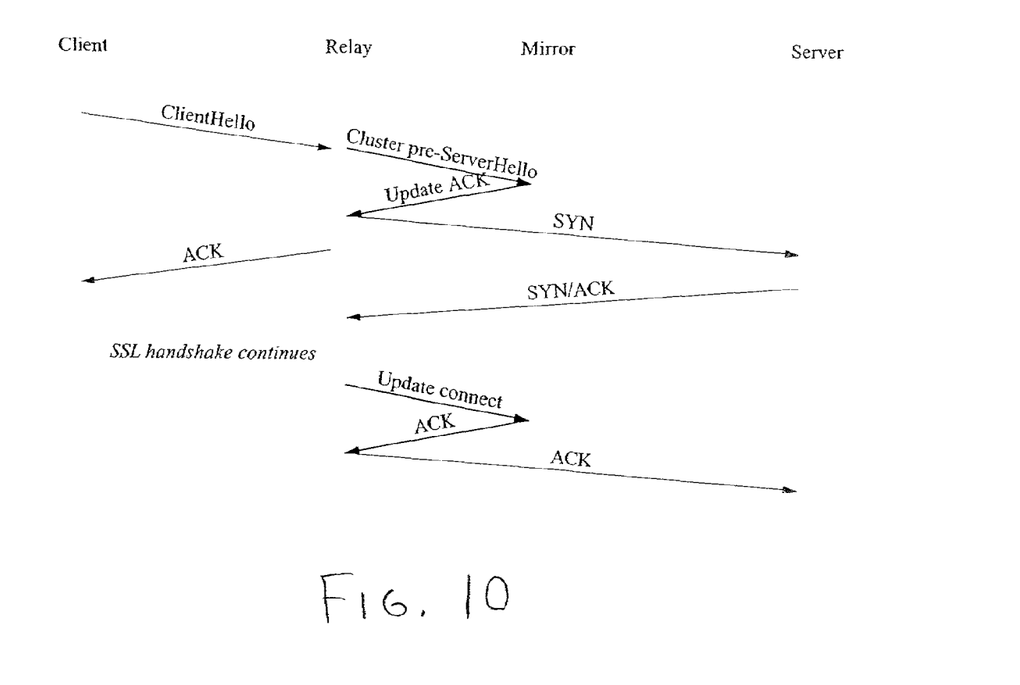
FIG. 10 is a diagram of parallel SSL client and server handshakes according to an example embodiment of the present invention.

FIG. 10 shows a diagram of parallel SSL client and server handshakes according to an example embodiment of the present invention. After the client connects, two processes may occur in parallel: the SSL handshake and the connect to the server. Either process may finish before the other. Both must be completed before entering the data state and preparing to read data from the client. Therefore, the TCP stack may be used to buffer the network traffic. However, unlike the TCP case, it's possible that there might be cluster checkpoints where only the client socket is valid. According to the present invention, when a failover occurs in such a state, the relay simply restarts the appropriate connect call. The TCP ISN may need to be deterministic to avoid getting RSTs during the connect. The correct ISN for the client connect is included in the first cluster checkpoint. Connection to the server does not begin until after the first cluster check point of the SSL handshake. This ensures that the mirror will have the clients ISN if it needs to restart the connect call.

In order to encrypt or decrypt an SSL record, the sequence number, the encryption state, and the MAC key may be required. Of these, only the encryption state and the sequence number vary. Clustering the sequence number may be straight forward, but the encryption state may be less obvious. When the decipher is Data Encryption Standard (DES), 3DES or Advanced Encryption Standard (AES), the key and the current Cipher Block Chaining (CBC) residue may be clustered. With RC-4 encryption/decryption algorithm, there are two options: (1) cluster the current key schedule, or (2) cluster the key and an offset into the stream. The second option may be more compact, but may also be excessively slow if failover occurs during a long transfer requiring the mirror to generate and discard megabytes of key stream. In SSL acceleration according to the present invention, the base state may be clustered every megabyte or so and in between transmit deltas. To avoid potential problems, the deltas may contain the offset from the beginning of the key stream. Thus, when an attempt to reconstitute the key stream occurs, this may be started from the last base update that has been received and then the key stream is advanced to the point in the delta.

Figure 11:
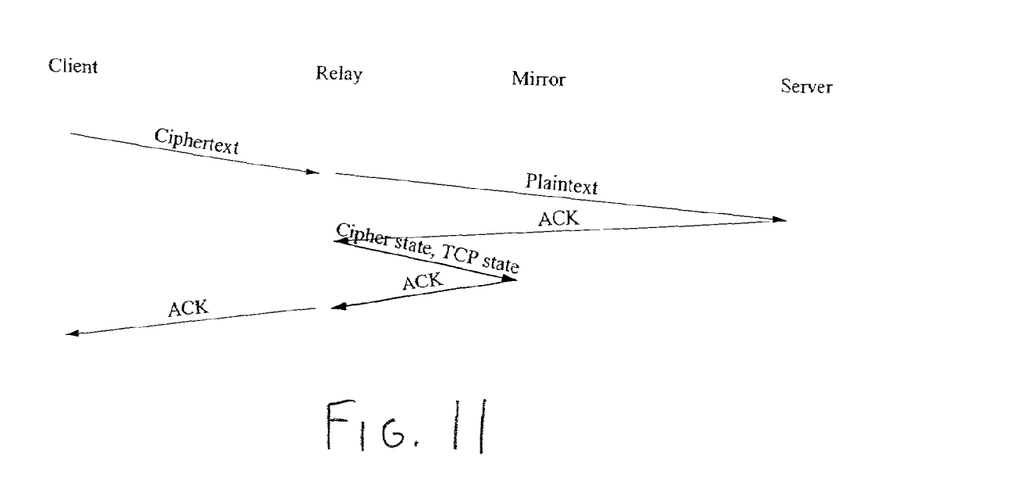
FIG. 11 is a diagram of SSL clustering of client to server writes according to an example embodiment of the present invention.

FIG. 11 shows a diagram of SSL clustering of client to server writes according to an example embodiment of the present invention. Clustering SSL client to server data transmission is analogous to clustering TCP communication, but more complicated. The additional complication is introduced by the need to cluster the cipher state and the need to handle one record at a time. With SSL, updates may only be generated whenever a full record is ACKed. Moreover, since SSL expands the data, the number of bytes to ACK to the client may be greater than the number of bytes that were ACKed by the server.

According to the present invention, in order to map server ACKs to state, a queue may be maintained for all records for which the plaintext has been written to the server but not yet ACKed. Whenever more data is ACKed by the server, the ACK pointer may be moved forward in this list the appropriate number of bytes. When a full record has been ACKed, it may be removed from the list and the new state clustered. Since multiple records may be decrypted before any of them are ACKed, each record in the queue may have its associated cipher state attached to it at the time it is decrypted. Thus, when a record is ACKed, the cipher state cluster is the one attached to the record. If multiple records are ACKed by a given server ACK, the state associated with the last one is clustered. If a failover occurs, the mirror may simply install its mirrored TCP.

Figure 12:
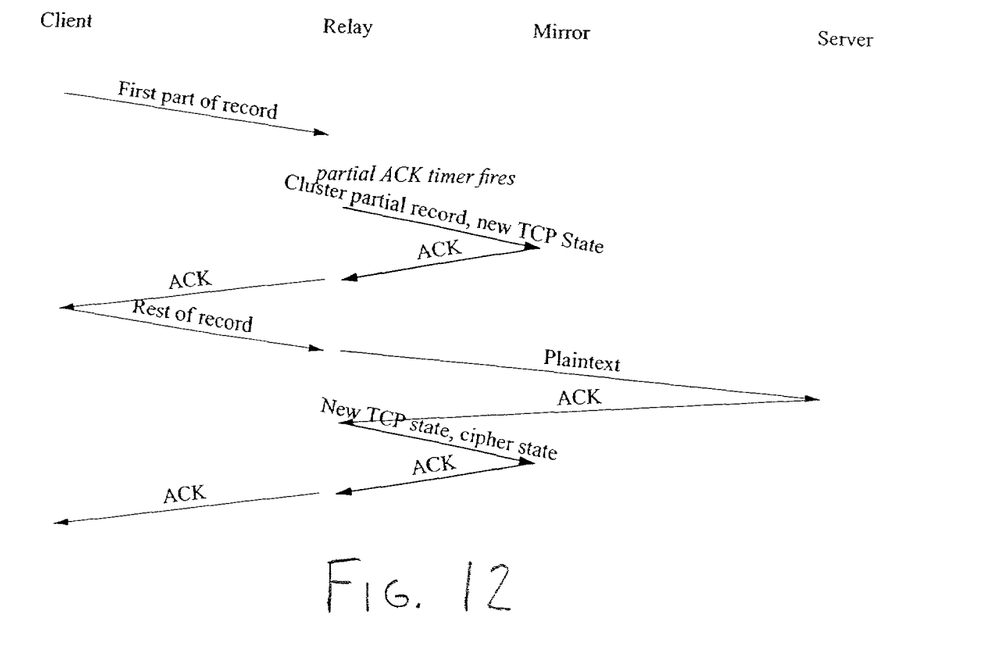
FIG. 12 is a diagram of a clustered SSL partial ACK according to an example embodiment of the present invention.

FIG. 12 shows a diagram of a clustered SSL partial ACK according to an example embodiment of the present invention. SSL records may be up to 32K long. This may introduce a problem in that a record may be too large to fit into a single TCP segment. If the record is especially large or the connection is still in slow start, it is possible that the effective window may be too small to carry the entire record. This produces the possibility of deadlock. The relay cannot ACK any data until the entire record has been read, but the client cannot transmit any more of the record until it receives an ACK. Therefore, the relay must ACK the data read so far. For this to occur the relay must first cluster that data. Clustering data rather than state is rare and avoided since it is expensive to do so. Apparatus and methods according to the present invention may maintain an estimator of the packet interval time (IAT). When a partial record is read, a timer may be set for two times the IAT. If that timer fires, the partially read record is clustered and then that section of data is ACKed. If a failover occurs during this period, the mirror simply picks up with reading the rest of the record.

Partial ACKs occur infrequently since the records usually fit into the effective window. Partial ACKs are only allowed to occur when there is no unACKed data written to the server. The expectation is that when the previous record is ACKed the client will transmit the rest of the record currently being read, but unfortunately this expectation is not always fulfilled. Therefore, according to the present invention, whenever an ACK is sent to the client and a partially read record exists, a timer may be set for the round trip time (RTT) plus the packet interval time. This allows the ACK to arrive at the client and the client to send the next segment if it is going to. If it doesn't, a partial ACK may once again be performed.

Figure 13:
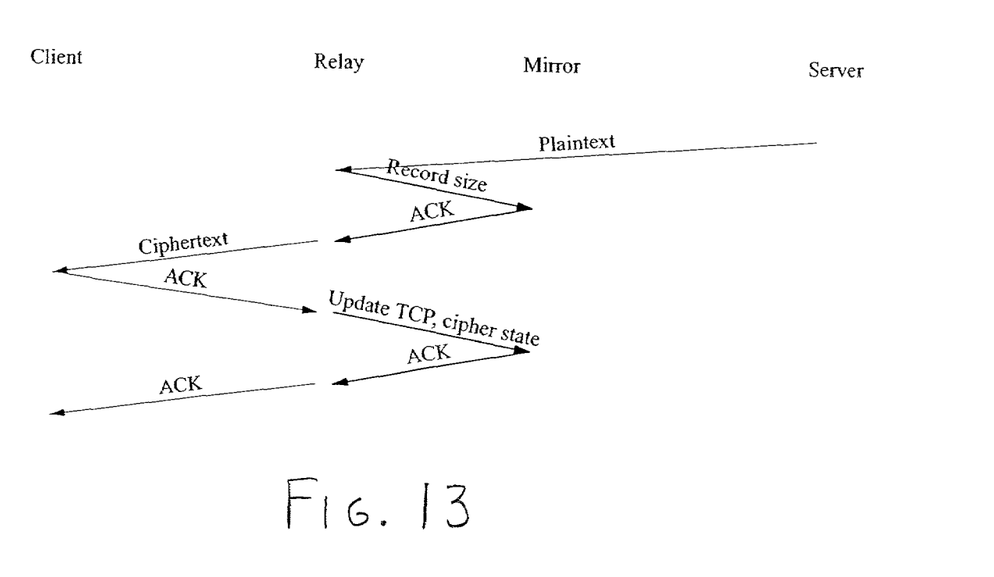
FIG. 13 is a diagram of SSL clustering of record size according to an example embodiment of the present invention.

FIG. 13 shows a diagram of SSL clustering of record size according to an example embodiment of the present invention. According to the present invention, the record size may be clustered before the record is transmitted. This avoids problems that may occur since TCP has no concept of record boundary. Therefore, a relay must be prepared to write data to a client as soon as the relay receives it since the sizes of the SSL records are somewhat arbitrary. The mirror maintains a list of the sizes of records that have been written but not ACKed. Thus, whenever the mirror receives a pre-write (the size of the record about to be written) the mirror adds it to the list. Whenever the mirror receives an update that a record was ACKed it removes that record from the list. Upon failover the mirror uses this list to determine what size records to read. The partial ACK technique may be used to remove any potential deadlocks.

Three conditions may trigger closing the connection: a close from the client, a close from the server, or an error. Rather than attempt to know each of these conditions and cluster them, methods and apparatus according to the present invention may withhold ACKs for the messages that generate them. After a failover, it is expected that the retransmits may generate the same condition on the mirror. However, if the closing is from an error, methods and apparatus according to the present invention may cluster that the session is not to be resumed. Once the mirror receives that update, the mirror may remove the entry from the session cache.

It may be required to transmit an alert for all three of these conditions. If so, read callbacks may be disarmed so that no further attempts are made to read data. The alert may then be transmitted. Once the alert is ACKed, shutting down of the socket may proceed, which may be performed as was described for TCP clustering.

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method comprising:
   connecting at least two Secure Sockets Layer (SSL) relays in a cluster;
   establishing a communication path between a first node and a second node via a first SSL relay of the cluster, wherein the communication path includes an SSL connection between the first node and the first SSL relay;
   transferring information between the first node and the first SSL relay, wherein the transferred information relates to a communication from the first node to the second node and wherein the transferred information includes a record;
   transferring the information between the first SSL relay and the second node; and
   clustering state information of the communication path when the record has been acknowledged by the second node, the clustering comprising sharing the state information between the first SSL relay and at least a second SSL relay of the cluster, wherein the second SSL relay is capable of taking over communications between the first and second nodes upon failure of the first SSL relay.

2. The method according to claim 1, wherein the first node comprises a client and the second node comprises a server.

3. The method according to claim 1, further comprising transferring the information related to the communication between the first node and the second node to the second SSL relay transparently upon failure of the first SSL relay.

4. The method according to claim 1, further comprising transmitting the communication from the first node to the second SSL relay and from the second SSL relay to the second node transparently upon failure of the first SSL relay.

5. The method according to claim 1, further comprising sharing an SSL session cache across all of the at least two SSL relays.

6. The method according to claim 1, further comprising clustering an SSL session resumption between the first node and the first SSL relay.

7. The method according to claim 1, further comprising clustering cryptographic keying information across all of the at least two SSL relays.

8. The method according to claim 7, further comprising clustering a key and a current Cipher Block Chaining (CBC) residue.

9. The method according to claim 7, further comprising clustering a sequence number.

10. The method according to claim 7, further comprising clustering a current key schedule.

11. The method according to claim 7, further comprising clustering a key and an offset into a key stream.

12. The method according to claim 1, further comprising clustering a cipher state.

13. The method according to claim 1, further comprising clustering data from a partial record corresponding to data from either the first or second node.

14. The method according to claim 1, further comprising clustering an information size.

15. The method of claim 1, further including: setting a timer when the record is read, wherein the record is a partial record; and clustering the partial record if the timer expires.

16. The method of claim 15, wherein the timer corresponds to two times a packet interval time.

17. The method of claim 1, further including storing an unacknowledged portion of the information transferred between the first SSL relay and the second node in a queue.

18. The method of claim 17, wherein the unacknowledged portion of the information transferred between the first SSL relay and the second node is stored in the queue with a cipher state associated with the information.

19. A system comprising:
a Secure Sockets Layer (SSL) relay cluster comprising at least two SSL relays, wherein the SSL relay cluster is configured to:
establish a communication oath between a first node and a second node via a first SSL relay of the cluster, wherein the communication path includes an SSL connection between the first node and the first SSL relay;
transfer information between the first node and the first SSL relay, wherein the transferred information relates to a communication from the first node to the second node and wherein the transferred information includes a record;
transfer the information between the first SSL relay and the second node; and
cluster state information of the communication path when the record has been acknowledged by the second node, the clustering comprising sharing the state information between the first SSL relay and at least a second SSL relay of the cluster, wherein the second SSL relay is capable of taking over communications between the first and second nodes upon failure of the first SSL relay.

20. The system according to claim 19, wherein the first node comprises a client and the second node comprises a server.

21. The system of claim 19, wherein the state information includes at least one of: a new TCP state, a current value of SSL handshake hashes and a handshake to enter upon failover.

22. The system of claim 19, wherein the first SSL relay is configured to transmit a handshake acknowledgment message to the first node.

23. The system of claim 22, wherein the handshake acknowledgment message includes at least one of: a server handshake and a server handshake completion message.

24. A computer readable storage medium storing computer readable instructions that, when executed by a processor, perform a method comprising:
establishing a connection between a first node and a second node via a first Secure Sockets Layer (SSL) relay of an SSL relay cluster, wherein said SSL relay cluster comprises at least two interconnected SSL relays and wherein the connection includes an SSL connection between the first SSL relay and the first node;
receiving a data communication from the first node, wherein at least a portion of the data communication is structured as a record;
transmitting the data communication to the second node;
receiving a first acknowledgment from the second node, wherein the first acknowledgment acknowledges the record;
following reception of the first acknowledgment, clustering state information of the established connection with at least a second SSL relay of the SSL relay cluster; and
receiving a second acknowledgment from the at least second SSL relay in the SSL relay cluster confirming successful clustering.

25. The computer readable storage medium according to claim 24, wherein the second SSL relay assumes the first SSL relay's responsibilities upon failure of the first SSL relay.

26. The computer readable storage medium according to claim 24, wherein the first node comprises a client and the second node comprises a server.

27. The computer readable storage medium of claim 24, further comprising additional instructions for:
setting a timer when the record is read, wherein the record is a partial record; and clustering the partial record if the timer expires.

28. The computer readable storage medium of claim 27, wherein the timer corresponds to two times a packet interval time.

29. The computer readable storage medium of claim 24, further including instructions for storing an unacknowledged portion of the data communication in a queue.

30. The computer readable storage medium of claim 29, wherein the data communication is stored in the queue with a cipher state associated with the record.

31. An Secure Sockets Layer (SSL) relay comprising:
a first interface for transferring information between a first node and the SSL relay, wherein the SSL relay is connected in a cluster of SSL relays and wherein the first interface includes an SSL connection between the first node and the SSL relay and wherein the information includes record formatted data;
a second interface for transferring the information between a second node and the SSL relay;
a third interface for transferring state information between SSL relays in the cluster when the record formatted data has been acknowledged by the second node; and a storage device, wherein state information of an SSL connection between the first node and the SSL relay is shared across each SSL relay in the cluster, any of the SSL relays in the cluster capable of taking over all connections of another SSL relay in the cluster, wherein the storage device is further configured to store the transferred information in a queue until acknowledgement is received from the second node.

32. The SSL relay according to claim 31, wherein the first node is a client and the second node is a server.

33. The SSL relay according to claim 31, wherein the first interface and the second interface are the same.

34. The SSL relay according to claim 31, wherein the second interface and the third interface are the same.

35. The SSL relay according to claim 31, wherein the first interface and the third interface are the same.

36. The SSL relay according to claim 31, wherein the first interface and the second interface and the third interface are the same.

* * * * *